United States Patent [19]

Wauters et al.

[11] 4,361,589
[45] Nov. 30, 1982

[54] INFUSED DRIED CELERY

[75] Inventors: Ronald P. Wauters, Dover, Del.; Ralph E. Kenyon, Belle Mead, N.Y.; Monoj K. Sarma; Larry L. Layton, both of Dover, Del.; Wade H. Swanson, Denair; Diane E. Hibler, Ripon, both of Calif.

[73] Assignee: General Foods Corporation, White Plains, N.Y.

[21] Appl. No.: 271,450

[22] Filed: Jun. 8, 1981

Related U.S. Application Data

[63] Continuation-in-part of Ser. No. 192,266, Sep. 30, 1980, abandoned.

[51] Int. Cl.³ .................................................. A23B 7/02
[52] U.S. Cl. ..................................... 426/270; 426/321; 426/639; 426/640
[58] Field of Search ............... 426/615, 456, 321, 442, 426/640, 281, 269, 270, 639, 444, 519, 426; 34/9

[56] References Cited

U.S. PATENT DOCUMENTS

| | | | |
|---|---|---|---|
| 2,420,517 | 5/1947 | Brandner et al. | 426/639 |
| 2,473,184 | 12/1947 | Webb | 426/281 |
| 2,509,719 | 5/1950 | Birdseyl | 426/640 |
| 2,516,891 | 8/1950 | Lloyd | 426/310 |
| 3,337,344 | 8/1967 | Savage | 426/634 |
| 3,425,548 | 2/1969 | Camirand et al. | 426/305 |
| 3,623,893 | 11/1971 | Mauge | 426/281 |
| 3,801,714 | 4/1974 | Shipman et al. | 426/310 |
| 3,952,112 | 4/1976 | Folger et al. | 426/321 |
| 4,011,348 | 3/1977 | Farrier et al. | 426/268 |
| 4,183,963 | 1/1980 | Brimelow et al. | 426/321 |

OTHER PUBLICATIONS

Dehydrated Celery: Effects of Predrying Treatments and Rehydration Procedures on Reconstitution, by H. J. Neuman, Journal of Food Science, vol. 37, 1972; pp. 437–441.

Osmotic Dehydration of Fruits by J. D. Ponting et al., Food Technology, Oct. 1966, pp. 125–128.

*Primary Examiner*—Raymond N. Jones
*Assistant Examiner*—Elizabeth J. Curtin
*Attorney, Agent, or Firm*—Thomas R. Savoie; Walter Scott; Daniel J. Donovan

[57] ABSTRACT

A dried infused celery which has extended storage stability and which upon rehydration possesses the taste, color, texture and appearance of fresh celery is prepared by soaking fresh celery pieces in a solution containing either lactose, glucose, a glucose syrup with a DE of 30 to 60 or derivatives thereof, the solution having a pH of 6.5 to 9 and maintained at a temperature of 120° F. (48° C.) to less than 220° F. (105° C.) and at a soaking concentration and period of time to infuse the celery pieces with from 55 to 85% sugar solids, followed by draining then drying the infused celery pieces.

24 Claims, No Drawings

INFUSED DRIED CELERY

RELATED APPLICATIONS

This is a continuation-in-part of Application Ser. No. 192,266, filed Sept. 30, 1980 now abandoned.

BACKGROUND OF THE INVENTION

This invention relates to a method of preparing dry celery pieces and the product obtained thereby. More particularly, this invention prepares storage-stable dry celery pieces which, upon rehydration, achieve a fresh or freshly cooked celery texture, taste, color and appearance.

Fresh celery pieces are often incorporated into many different foods, e.g. salads, meat and seafood dishes, stuffing, etc., for the crunchy and turgid, fresh or freshly cooked texture of the pieces, as well as the taste and appearance imparted by the individual celery pieces. Celery is unique in its high moisture content (about 95%) and desireable crunchy texture, the texture being due to its cell structure which is difficult to maintain upon drying. When celery pieces are dried to preserve the celery for subsequent use in various foods, the parenchyma cell structure of the celery becomes distorted and non-characteristic of fresh celery, resulting in a flaccid, tough and stringy texture upon rehydration.

While some attempts have been made to preserve the fresh celery texture, generally these attempts either did not adequately provide a fresh celery texture, or resulted in a taste, color and appearance uncharacteristic of fresh celery. U.S. Pat. No. 3,801,714, by Shipman et al, equilibrates a fresh vegetable such as celery with a solution of glycerol, followed by drying. However, when celery pieces were prepared by incorporating glycerol, upon rehydration the celery pieces were excessively sweet with a bitter note, and the resultant texture was soft. U.S. Pat. No. 2,420,517 by Brandner et al discloses a process for osmotically dehydrating foods by immersing the food in a hydrophillic solution. While vegetables such as celery are disclosed and the hydrophillic materials include various sugars, when the process of the Brander et al patent, as in Example I(a), was tried with celery it was found that the infused celery had a tough texture and an excessively sweet flavor and there was no disclosure of means to preserve the fresh celery color. Various other patents, such as U.S. Pat. Nos. 3,425,848 and 2,473,184 also disclose osmotic dehydration of foods, but neither incorporates a sufficient level of solids to maintain the texture of the celery pieces.

It therefore is a feature of this invention to prepare dried celery pieces in which a fresh or freshly cooked texture, color, taste and appearance is obtained upon rehydration.

SUMMARY OF THE INVENTION

Briefly, dried infused celery pieces are prepared which, upon rehydration, possess the taste, texture, color and appearance of fresh or freshly cooked celery by soaking fresh celery pieces in a solution containing a sugar chosen from the group consisting of lactose, glucose, a glucose syrup having a DE of 30 to 60 and derivatives thereof. During soaking, the solution is maintained at a temperature of 120° F. (48° C.) to less than 220° F. (105° C.) and at a concentration and a period of soaking time to infuse the celery with a level of sugar solids within the range of 55% to 85%, based on the dry weight of the celery, effective to preserve a fresh or freshly cooked celery texture, color, appearance and taste without an excessive sweet or bitter taste upon drying then rehydrating the infused celery pieces. To maintain the fresh celery color the soaking solution is adjusted to a pH of 6.5 to 9, preferably 7 to 8.5, and additionally, for an optimum fresh green celery color a sulphite salt is added to the solution. Following the infusion, the celery is drained and dried. The dried celery pieces prepared by this invention have extended storage stability and upon rehydration possess a fresh or freshly cooked celery texture and a taste, color and appearance of fresh celery.

DETAILED DESCRIPTION OF THE INVENTION

The invention involves the infusion of fresh celery pieces with a critical level of a specified sugar in a solution of a controlled pH, followed by drying in order to obtain dried celery pieces which upon rehydration possess an improved fresh texture, taste, color and appearance.

The celery pieces are obtained by means common in the art. For example, fresh celery stalks are sliced transversely into pieces ⅛ inch to ¼ inch wide. Pieces greater than about ½ inch are generally undesirable as it is difficult to achieve the required level of infusion without excessive soaking times and/or temperatures.

The celery pieces are soaked in a solution containing a sugar chosen from the group consisting of lactose, glucose, a glucose syrup having a DE of 30 to 60 and derivatives thereof. These specified sugars are critical in producing a dried celery which upon rehydration, has the texture of fresh or freshly cooked celery, but without an excessively sweet or bitter taste which masks the celery flavor as is common with other sugars such as glycerin, sucrose, fructose, propylene glycol, etc. These specified sugars are able to infuse into the cells of the celery at levels which maintain the characteristic polyhedron cell structure and prevent the cell walls from collapsing during subsequent dehydration, as well as facilitating the absorption of water into the cells during rehydration. The specified sugars produce a rehydrated celery which is relatively bland, without masking the celery flavor.

The preferred sugar is a glucose syrup, such as corn syrup, with a DE of 30 to 60 as it imparts to the dry celery when rehydrated a fresh or freshly cooked celery texture and taste, without any excessively sweet or bitter notes. A glucose syrup is a concentrated aqueous solution of nutritive saccharides obtained from starch or other cellulose material. The DE is the dextrose equivalent of a glucose syrup which is defined as reducing sugar content of the syrup expressed as dextrose on a dry-substance basis. When the DE of the glucose syrup is below 30 the resultant celery when rehydrated was unacceptable as the celery exhibits a tough, flaccid texture uncharacteristic of fresh or freshly cooked celery. Photomicrographs revealed that when rehydrated, the dried celery infused with a corn syrup having a DE of 30 to 60 had a parenchyma cell structure similar to freshly cooked celery, while dried celery infused with a corn syrup having a DE of 10 to 20 showed a collapse of the parenchyma cell wall structure when rehydrated similar to that observed with a non-infused dried celery when rehydrated. When the DE of the glucose syrup was above 60, the resultant celery when rehydrated was unacceptable as the taste was excessively sweet masking the celery flavor. A corn syrup with a DE of 35 to 45 was optimum in the crisp celery texture and bland flavor produced, with a DE of about 30 to 40 being preferred for a freshly cooked celery texture which is softer and turgid, while a DE of about 50 to 60 being preferred for a fresh celery texture which is crisper and turgid.

Derivatives of the specified sugars would include sorbitol which is a derivative of glucose, as well as a fructose containing glucose syrup (corn syrup) which is prepared by converting the dextrose in the syrup. However, care must be taken in that the derivative is not overly sweet so as to impart an excessively sweet taste to the rehydrated celery which masks the celery flavor at the levels of infusion required by this invention.

The concentration and amount of the solution is such as to effect the required level of infusion into the celery pieces. Generally, the amount of solution is in a weight ratio to the celery pieces of 1:1 to 14:1, and the concentration of the solution ranges from 20 to 75%, preferably 30 to 50%. Alternatively, the celery pieces can be soaked in a series of solutions of increasing concentration to obtain the required level of infusion.

The temperature of the solution and time of soaking is important from the standpoint of processing control and maintaining the desireable fresh or freshly cooked celery texture. The solution temperature and soaking time are interdependent variables which are controlled to achieve the required infusion levels while maintaining the desired celery texture and quality. When the solution temperature is too high for an excessive time period the celery texture becomes mushy, while when the solution temperature is too low the celery texture becomes tough as well as requiring excessive soaking times to obtain the required level of infusion. The temperature of the solution is maintained within the range of 120° F. (48° C.) to less than 220° F. (105° C.). This invention enables the celery to be blanched (e.g. above about 160° F., 70° C.) to further increase storage stability of the celery and yet produce dehydrated celery pieces which upon rehydration are not stringy or mushy and maintain the desired celery texture and quality.

The period of soaking time is important to obtain the required level of infusion, but this time period is dependent upon the concentration and temperature of the solution, whether the soaking is carried out under atmospheric, vacuum or pressure conditions, as well as the size of the pieces and whether the solution is agitated during infusion. Preferably the soaking time is between 30 minutes and 4 hours when the solution temperature is within the range of 130° F. (55° C.) to 165° F. (75° C.), and 15 seconds to 30 minutes when the solution temperature is within the range of 165° F. (75° C.) to 200° F. (95° C.). While the celery pieces are preferably soaked in a bath of solution, a steady spray or stream of solution would also be suitable.

Of critical importance to this invention is the infusion of the celery pieces with the specified sugar at a level of sugar solids, within the range of 55 to 85% by dry weight, effective to preserve a fresh or freshly cooked celery texture, color, appearance and taste in the celery pieces without an excessively sweet or bitter taste upon drying then rehydrating the infused celery pieces. Lower levels of infusion result in a tough, less turgid texture and with the color being less stable. Higher levels of infusion result in an excessively sweet and excessively tough or firm texture uncharacteristic of fresh or freshly cooked celery. The preferred level of infusion to maximize the celery texture and stability is 60 to 80% sugar solids by dry weight.

To obtain a fresh celery color and appearance which is stable even over prolonged storage of the dried celery, the soaking solution is adjusted to a pH of 6.5 to 9, and is preferably adjusted to a pH of 7 to 8.5 for an optimum fresh green celery color. When the pH of the soaking solution is below 6.5 there is observed undesireable grey and yellow color notes and reduced color stability, while at a pH above 9 there is observed undesireable brown notes and reduced color stability. This pH control results in an infused dried celery which remarkably and surprisingly maintains its fresh green celery color and appearance over extended and severe storage conditions (e.g. 1 year at 95° F., 35° C. and 75% RH). Additionally, to preserve an optimum fresh green celery color and retard browning during dehydration and storage, a sulphite salt (e.g. sodium sulphite) is added to the solution, preferably at levels of 250 to 2500 parts per million. As an additional alternative, flavors and/or colors may also be infused into the celery with the soaking solution.

Following soaking of the celery in the solution to obtain the required level of infusion, the infused celery is drained, rinsed and dried. Drying is preferably conducted at product temperatures no greater than 135° F. (58° C.) to minimize heat damage and to preserve the fresh celery color and promote stability over storage of the dried celery. The drying can be carried out by conventional means, as by air drying or freeze drying, to dry the celery to a moisture content which is suitable for storage, i.e., less than 10% moisture by weight for a dehydrated celery, and for an intermediate moisture shelf stable celery to a moisture content wherein the Aw is less than 0.75 (less than about 20% moisture at 70° F., 20° C.).

The resultant dried infused celery has a remarkable and unexpected extended storage stability (e.g. 1 year at 95° F., 35° C. and 75% RH, packaged in foil) while maintaining its desireable texture, color and appearance when rehydrated, as compared to non-infused dried celery (treated with sodium sulfite) which exhibited a noticeable loss of color and product quality after 2 months and had an unacceptably browned color and loss of product quality after 5 months. The rehydrated infused celery is more evident when incorporated in a finished product, than rehydrated non-infused air dried celery, while possessing a taste, texture, color and appearance of fresh or freshly cooked celery. Further, the dried infused celery when rehydrated is about twice the weight and volume of rehydrated non-infused air dried celery. The dried celery can be reconstituted with cold, warm or boiling water, with the corresponding rehydration times which are dependent upon temperature. For example, an air-dried infused celery can be added to boiling water followed by steeping for 10 minutes to rehydrate the celery.

EXAMPLE I

Fresh celery was trimmed, washed and the stalk sliced transversely into a ⅛ inch thickness. The celery pieces were then soaked in a bath containing corn syrup with a DE of 42, at a 30% solids concentration. The solution was adjusted to a pH of 8 with the addition of 500 ppm of $SO_2$ from $Na_2SO_3$. The weight ratio of solution to celery was 4 to 1. The soaking was carried out for one hour at a solution temperature of 150° F.

(65° C.) to achieve an infusion level of about 75% sugar solids by dry weight. The infused celery pieces were then air dried overnight at 125° F. (52° C.) to a moisture content of about 5%. The dried infused celery pieces were rehydrated by bringing the dried celery to a boil in excess water, followed by simmering for 10 minutes.

The dried infused celery pieces when rehydrated had the desired green color and appearance of fresh celery and the texture was crunchy and turgid as is characteristic of fresh celery. The taste of the rehydrated celery was that of fresh celery without any excessive sweet or bitter notes to mask the celery flavor.

In comparison, rehydrated air-dried non-infused celery had a grey-green color which is not characteristic of fresh celery and possessed a tough, flaccid texture.

The dried infused celery pieces were subjected to an accelerated storage study versus a control of non-infused air dried celery (⅛ inch cross-cut and treated with sodium sulphite) packaged in a foil pouch and under conditions of 90° F. (32° C.) for 12 months, 95° F. (35° C.) and 75% relative humidity for 12 months, and 110° F. (43° C.) for 10 months. The control celery sample exhibited a deterioration of color and texture over all the above conditions starting at 2 months and had acceptable browning and loss of texture after 5 months. The infused celery samples maintained their optimum color and texture without deterioration for the entire 12 months under the 90° F. (32° C.) and 95° F. (35° C.) and 75% RH conditions, and for 10 months under the 110° F. (43° C.) condition. This surprising storage stability exhibited by the dried infused celery samples will enable packaging, distribution and ultimate use by the consumer while maintaining the fresh celery color and appearance, and the fresh or freshly cooked celery texture of the dried infused celery pieces when rehydrated.

EXAMPLE II

Fresh celery cross cut to ⅛ inch thickness was soaked in a bath containing sorbitol at a 30% solids concentration. The solution was adjusted to a pH of 8 by the addition of 500 ppm of $SO_2$ from $Na_2SO_3$. The solution was maintained at 155° F. (68° C.) for 1 hour, with a weight ratio of solution to celery pieces of 4 to 1. The sorbitol was infused at a level of about 80% solids by dry weight. The infused celery was then drained and air dried overnight at 130° F. (54° C.) to a moisture content of about 5% by weight. The dried infused celery pieces were rehydrated by bringing the dried celery to a boil in excess water, followed by simmering for 10 minutes.

The rehydrated celery had a desireable crunchy and turgid texture characteristic of fresh celery and a fresh celery color and appearance. There was a fresh bland celery flavor without any excessive sweet or bitter notes. The dried infused celery was stable and maintained its desireable characteristics over storage.

EXAMPLE III

Fresh celery cross cut to ⅛ inch thickness was soaked in an agitated solution containing corn syrup solids (42 DE) at a 30% solids concentration, with 1000 ppm of $SO_2$ from $Na_2SO_3$ and at a pH of 7. The solution was maintained at 170° F. to 180° F. (77° C. to 82° C.) with a soaking time for the celery pieces of about 3 minutes resulting in blanching of the celery pieces. The weight ratio of soaking solution to celery pieces was 12 to 1. The celery was drained and dryed to 5-7% moisture content by weight. The corn syrup was infused into the celery at a level of 62.5% on a dry solids basis.

The dried infused celery pieces then rehydrated had a desired green color and appearance of freshly cooked celery and a crunchy and turgid texture as is characteristic of freshly cooked celery. The flavor of the rehydrated infused celery was a fresh bland celery flavor without excessive sweet or bitter notes. The dried infused celery was stable and maintained its desireable characteristics over storage.

A non-infused celery which was blanched then dehydrated upon rehydration exhibited a mushy, stringy texture uncharacteristic of freshly cooked celery.

What is claimed:

1. Process for preparing dried infused celery pieces with extended storage stability which upon rehydration possess the taste, color, texture and appearance of fresh celery:
   soaking fresh celery pieces in a solution containing a sugar chosen from the group consisting of lactose, glucose, glucose syrup with a DE within the range of 30 to 60 and derivatives thereof, the solution being at a pH of 6.5 to 9 and maintained at a temperature within the range of 120° F. to less than 220° F. and at a soaking concentration and for a period of soaking time to infuse the celery pieces with a level of sugar solids within the range of 55 to 85% by dry weight effective to preserve the fresh or freshly cooked celery texture, color, appearance and taste in said celery pieces without an excessive sweet or bitter taste upon drying then rehydrating said infused celery pieces;
   then draining the infused celery pieces; and
   then drying the celery pieces 2. Process of claim 1 wherein the solution is adjusted to a pH of 7 to 8.5.

3. Process of claim 2 wherein a sulphite salt is added to the solution to improve the color and color stability of the celery.

4. Process of claim 3 wherein the sulphite salt is sodium sulphite and is added to the solution at levels of 250 to 2500 parts per million.

5. Process of claim 1 wherein the soaking is effective to infuse the celery pieces with 60 to 80% sugar solids by dry weight.

6. Process of claim 5 wherein the solution to celery weight ratio is within the range of 1:1 to 14:1.

7. Process of claim 1 wherein the solution is maintained at a temperature of 130° F. to 165° F. with the soaking time within the range of 30 minutes to 4 hours.

8. Process of claim 1 wherein during drying the celery product temperature is maintained at a temperature no greater than 135° F.

9. Process of claim 8 wherein the celery is dried by freeze drying.

10. Process of claim 8 wherein the celery is dried by air drying.

11. Process of claim 1 wherein the soaking is carried out in stages with solutions of increasing concentrations.

12. Process of claim 1 wherein the concentration of sugar in the solution is within the range of 20% to 75% by weight.

13. Process of claim 7 wherein the concentration of sugar in the solution is within the range of 30% to 50% by weight.

14. Process of claim 13 wherein agitation is imparted during soaking to accelerate infusion.

15. Process of claim 8 wherein the celery is dried to a moisture content less than 10%.

16. Process of claim 1 wherein the solution is maintained at a temperature of 165° F. to 200° F. with the soaking time within the range of 15 seconds to 30 minutes.

17. Process of claim 1 wherein the sugar is a corn syrup.

18. Process of claim 17 wherein the DE of the corn syrup is within the range of 35 to 45.

19. Process of claim 1 wherein the sugar is a sorbitol.

20. Process of claim 8 wherein the celery is dried to an intermediate moisture wherein the Aw is below 0.75.

21. Process of claim 1 wherein the fresh celery pieces have been transversely sliced into pieces no large than about ½ inch wide.

22. Process of claim 1 wherein the celery pieces are blanched during soaking.

23. Product prepared by the process of claims 1, 3, 7, 8 or 15.

24. Product prepared by the process of claims 18, 19, 20, 21 or 22.

* * * * *